United States Patent
Ka et al.

(10) Patent No.: US 12,547,113 B2
(45) Date of Patent: Feb. 10, 2026

(54) IMAGE FORMING APPARATUS WITH STRUCTURE TO SELECTIVELY GUIDE PRINT MEDIUM TO READING MEMBER FOR SCANNING IMAGE THEREON

(71) Applicant: Hewlett-Packard Development Company, L.P., Spring, TX (US)

(72) Inventors: Duckhyun Ka, Seongnam Si (KR); Seungjae Lee, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 39 days.

(21) Appl. No.: 18/698,600

(22) PCT Filed: Apr. 29, 2022

(86) PCT No.: PCT/US2022/026917
§ 371 (c)(1),
(2) Date: Apr. 4, 2024

(87) PCT Pub. No.: WO2023/059373
PCT Pub. Date: Apr. 13, 2023

(65) Prior Publication Data
US 2024/0427276 A1    Dec. 26, 2024

(30) Foreign Application Priority Data
Oct. 7, 2021    (KR) .................. 10-2021-0133283

(51) Int. Cl.
*G03G 15/00* (2006.01)
(52) U.S. Cl.
CPC ....... *G03G 15/602* (2013.01); *G03G 15/5058* (2013.01)

(58) Field of Classification Search
CPC .................. G03G 15/602; G03G 15/5058
See application file for complete search history.

(56) References Cited

U.S. PATENT DOCUMENTS

| | | | |
|---|---|---|---|
| 9,944,097 B1 | 4/2018 | Younis et al. | |
| 2004/0234304 A1 | 11/2004 | Tsuchiya | |
| 2007/0126165 A1* | 6/2007 | Kawata | B65H 45/18 270/37 |
| 2013/0293909 A1* | 11/2013 | Endo | H04N 1/00572 358/1.12 |
| 2014/0327921 A1* | 11/2014 | Ogata | H04N 1/00612 358/1.12 |
| 2016/0360057 A1* | 12/2016 | Ogasawara | H04N 1/00615 |
| 2017/0302814 A1 | 10/2017 | Yamamoto | |
| 2017/0308021 A1 | 10/2017 | Kato et al. | |
| 2018/0001677 A1* | 1/2018 | Kikui | B41J 13/10 |
| 2018/0281430 A1* | 10/2018 | Ohta | H04N 1/00591 |

FOREIGN PATENT DOCUMENTS

| | | |
|---|---|---|
| JP | 2006-168972 A | 6/2006 |
| JP | 2007-110548 A | 4/2007 |

* cited by examiner

*Primary Examiner* — David H Banh
(74) *Attorney, Agent, or Firm* — Foley & Lardner LLP (57) ABSTRACT

An example image forming apparatus includes a printing portion to print an image on a print medium, a gate member at an outgoing side of the printing portion to selectively guide the print medium discharged from the printing portion to a first route or a second route, and a reading member in the first route to read the image from the print medium discharged from the printing portion.

14 Claims, 5 Drawing Sheets

IMAGE FORMING APPARATUS WITH STRUCTURE TO SELECTIVELY GUIDE PRINT MEDIUM TO READING MEMBER FOR SCANNING IMAGE THEREON

BACKGROUND

A multifunction apparatus may include a printing portion to print an image on a print medium and a scanning portion to read image information from a document. The scanning portion may be arranged above the printing portion. A transport route of a print medium may be provided in the printing portion, and a transport route of a document may be provided in the scanning portion. The transport route of a print medium and the transport route of a document may be separated from each other, and may not be connected to each other. After an image is printed, to read image information of a print medium discharged from the printing portion, a user may provide the print medium discharged from the printing portion to the scanning portion. For example, a user may put the print medium on a paper feeding stand of an automatic document feeder of the scanning portion, or put the print medium on a platen glass after opening a cover of the scanning portion.

BRIEF DESCRIPTION OF THE DRAWINGS

Various examples will be described below by referring to the following figures.

DETAILED DESCRIPTION

An image forming apparatus may have a printing portion to print an image on a print medium. A separate scanner may be provided to read an image printed on the print medium. In a case where the image forming apparatus is a multifunction apparatus including a scanning portion, a user may put a print medium discharged from the printing portion on a document feeding stand or a platen glass of the scanning portion.

In an example, the image forming apparatus may include a printing portion to print an image on a print medium and a reading member arranged at an outgoing side of the printing portion to read an image from the print medium. A gate member may selectively guide a print medium discharged from the printing portion to a first route or a second route which are separated from each other. The reading member may be arranged in the first route to read an image from a print medium guided to the first route. The second route may be a detour route in which a print medium detours the reading member and is discharged from the image forming apparatus. The print medium may be guided to the first route in a case where a scanning operation is to be performed, and may be guided to the second route in a case where the scanning operation is not to be performed. Accordingly, pollution of a scan glass by an alien substance which may occur during a transport process of the print medium may be prevented.

For example, the first route and the second route may be divided by a dividing plate opposing the scan glass of the reading member. The dividing plate may include, for example, a reference member to provide a white balance standard of the reading member, for example, a white bar. As the dividing plate covers the scan glass, the scan glass pollution by an alien substance which may occur during a process of transporting the print medium to the second route may be prevented. The dividing plate may have a structure to guide a print medium that has entered the first route so that a front end of the print medium contacts the scan glass. A position where the front end of the print medium is in contact with the scan glass may be a position that is spaced apart upstream from a reading position. According to such an example structure, during the transport of the print medium to the first route, the front end of the print medium may be in contact with the scan glass, and an alien substance on the surface of the scan glass may be removed. For example, the dividing plate may have a fixed position. The reading member may be elastically biased by an elastic member in a direction approaching the dividing plate. The reading member may elastically approach the dividing plate or be spaced apart from the dividing plate depending on a thickness of the print medium. Accordingly, an image may be reliably read from a print medium of various thicknesses.

An example method of controlling an image forming apparatus may include printing an image on a print medium using a printing portion, selectively guiding the print medium discharged from the printing portion to a first route in which a reading member is arranged or a second route which is a detour route, and reading the image from the print medium guided to the first route using the reading member. An example method of controlling an image forming apparatus may include printing a test image on a print medium. An example method of controlling an image forming apparatus may include transmitting read image information. As an example, the method may include transmitting read image information to a device located outside the image forming apparatus. Hereinafter, examples of an image forming apparatus and a control method of the same will be described with reference to the drawings. In the drawings, like reference numerals denote like members, and sizes and thickness of each component may be exaggerated for clarity.

Figure 1:
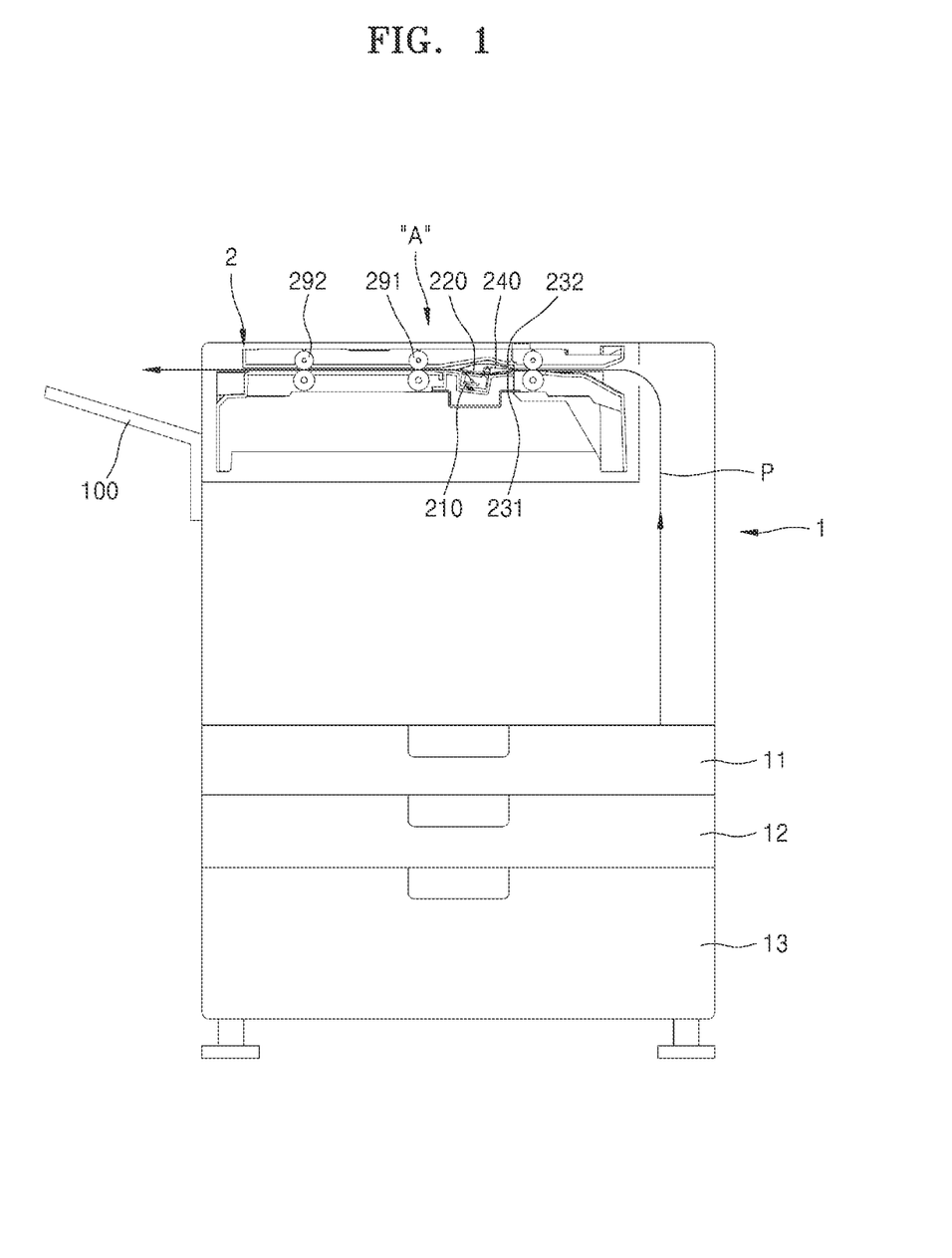
FIG. 1 illustrates an image forming apparatus according to an example.

FIG. 1 illustrates an image forming apparatus according to an example.

With reference to FIG. 1, an image forming apparatus may include a printing portion 1 to print an image on a print medium P, a gate member 240 arranged at an outgoing side of the printing portion 1 to selectively guide the print medium P discharged from the printing portion 1 to a first route 231 or a second route 232, and a reading member 210 arranged in the first route 231 to read the image from the print medium P. The reading member 210, the first route 231, the second route 232, and the gate member 240 may form a scanning portion 2. The scanning portion 2 may be arranged between the printing portion 1 and a discharge tray 100 to perform a scanning operation in which an image is read from the print medium P guided to the first route 231. In a case where the scanning operation is not performed, the print medium P may be discharged to the discharge tray 100 through the second route 232. The scanning portion 2 may be selectively attached or removed between the printing portion 1 and the discharge tray 100.

The printing portion 1 may print an image on the print medium P provided from a paper feeder. For example, the paper feeder may include a cassette type paper feeder. The cassette type paper feeder may include a main cassette feeder 11 arranged below the printing portion 1, a secondary cassette feeder 12 arranged below the main cassette feeder 11, a high-capacity feeder 13 arranged below the main cassette feeder 11, etc. Although it is not shown in the drawings, the paper feeder may be a multi-purpose tray (MPT).

The printing portion 1 may print an image on the print media P by various printing methods, such as an electrophotographic method, an inkjet method, a thermal sublimation method, etc. For example, the printing portion 1 may print an image on the print medium P by the electrophotographic method. The printing portion 1 may include a photoconductor, a charger, an optical scanner, a developing device, a transfer unit, a fuser, etc. The optical scanner may form an electrostatic latent image on a surface of the photoconductor by scanning light modulated according to image information on the surface of the photoconductor charged by a uniform surface electric potential. The developing device may develop the electrostatic latent image into a visible toner image by supplying toner to the electrostatic latent image. The transfer unit may transfer the toner image formed on the surface of the photoconductor to the print medium. The transferred toner image may be attached to the print medium by an electrostatic force. The fuser may apply heat and pressure to the toner image to attach the toner image to the print medium.

A printed print medium P may be discharged to the discharge tray 100. The reading member 210 to read an image from a print medium P discharged from the printing portion 1 may be arranged between the printing portion 1 and the discharge tray 100. The reading member 210 may include a light source to irradiate light to the print medium P and a photoelectric conversion element to convert an optical signal into an electric signal by receiving light reflected from the print medium P and photoelectric-converting the received light. A contact type image sensor (CIS), a charge coupled device (CCD), etc. may be employed as the reading member 210. In this example, a CIS may be employed as the reading member 210. The reading member 210 may be a one-dimensional sensor which has a length in a main scanning direction. As the print medium P is moved in a sub-scanning direction along the first route 231 and the reading member 210 reads an image from the print medium P at a fixed position, two-dimensional image information may be obtained.

The first route 231 and the second route 232 may be arranged between the printing portion 1 and the discharge tray 100. The reading member 210 may be arranged in the first route 231. The gate member 240 may be arranged at an outgoing side of the printing portion 1. The gate member 240 may be arranged between the printing portion 1 and the reading member 210 to selectively guide the print medium P discharged from the printing portion 1 to the first route 231 or the second route 232. The gate member 240 may be shifted between a first position and a second position which respectively guide the print medium P to the first route 231 and the second route 232. In an example, the gate member 240 may be rotated with respect to a hinge 241. Although it is not shown in the drawings, the gate member 240 may be rotated between the first position and the second position by an actuator 260 such as a solenoid, a linear motor, a rotary motor, etc. (see FIG. 6) which may be controlled by a control signal of a processor 20 (see FIG. 6). The print medium P passing through the first route 231 or the second route 232 may be discharged to the discharge tray 100 by discharge rollers 291 and 292.

Figure 2:
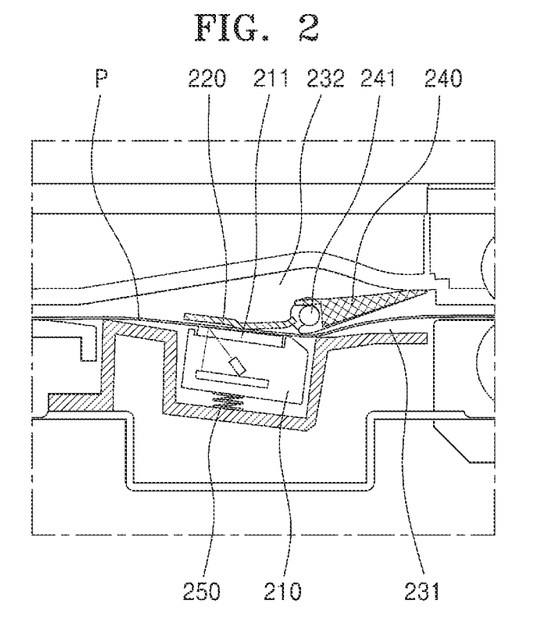
FIG. 2 is an enlarged view of a region "A" of FIG. 1 showing a gate member at a first position according to an example.
Figure 3:
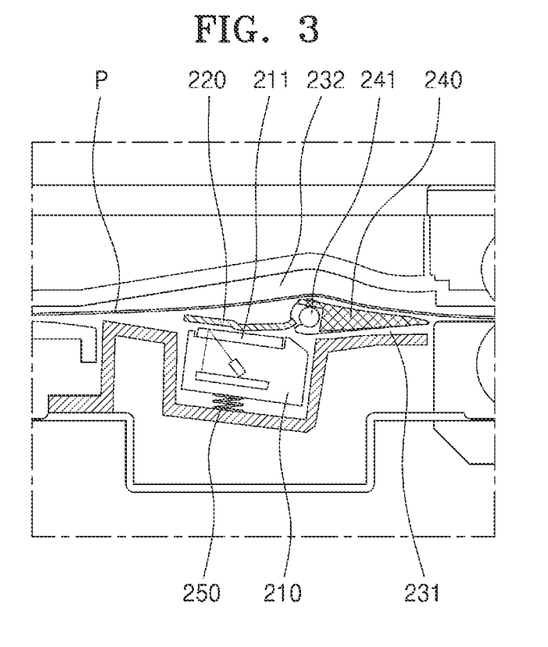
FIG. 3 is an enlarged view of the region "A" of FIG. 1 showing a gate member arranged at a second position according to an example.

FIG. 2 is an enlarged view of a region "A" of FIG. 1 showing a gate member at a first position according to an example. FIG. 3 is an enlarged view of the region "A" of FIG. 1 showing the gate member arranged at a second position according to an example.

With reference to FIGS. 2 and 3, the first route 231 and the second route 232 may be divided by a dividing plate 220. The dividing plate 220 may oppose a scan glass 211 of the reading member 210 and cover the scan glass 211. The dividing plate 220 may provide, for example, a reference for adjusting a white balance of the reading member 210. To this end, at least a side opposing the scan glass 211 of the dividing plate 220 may include a white bar.

The dividing plate 220 may have a fixed position. An elastic member 250 may apply an elastic force to the reading member 210 in a direction approaching the dividing plate 220. The elastic member 250 may be implemented in various forms such as, for example, a leaf spring, a compressive coil spring, etc. The scan glass 211 of the reading member 210 may be elastically in contact with the dividing plate 220, and may be elastically maintained in a position spaced apart from the dividing plate 220 by a certain distance by a stopper (not shown). Based on the print medium P being guided to the first route 231 and entering between the dividing plate 220 and the scan glass 211, the scan glass 211 may be elastically in contact with an image side (i.e., a side opposing the scan glass 211) of the print medium P due to the elastic force of the elastic member 250. In this manner, an image may be stably read from a print medium P of various thicknesses.

Figure 6:
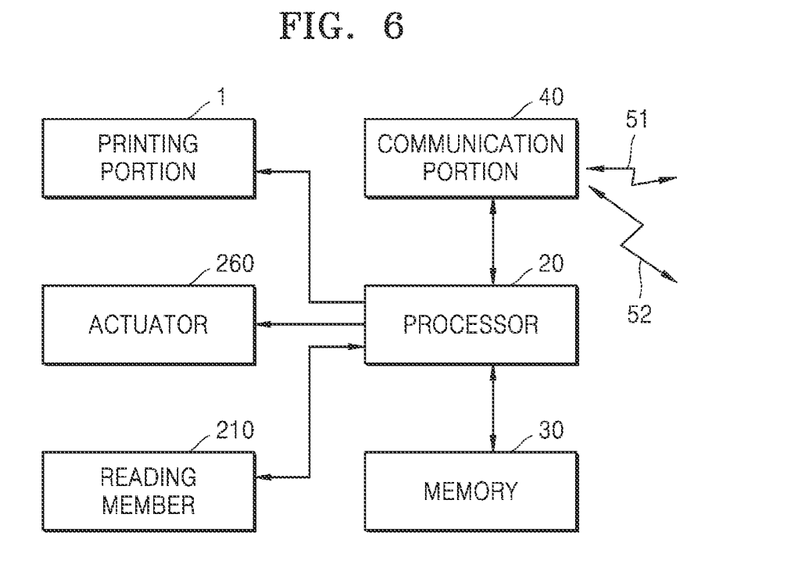
FIG. 6 is a schematic block diagram of an image forming apparatus according to an example.

In a case where the scanning operation is performed, the gate member 240 may be shifted to the first position illustrated in FIG. 2, by an actuator 260 (see FIG. 6). By the gate member 240, the first route 231 may be opened, and the second route 232 may be closed. The print medium P discharged from the printing portion 1 may be guided by the gate member 240 and enter the first route 231. Based on the print medium P passing through the first route 231, the reading member 210 may read image information on the print medium P. The print medium P may be discharged to the discharge tray 100 by the discharge rollers 291 and 292. In a case where the scanning operation is not performed, the gate member 240 may be shifted to the second position illustrated in FIG. 3, by the actuator 260. By the gate member 240, the second route 232 may be opened, and the first route 231 may be closed. The print medium P discharged from the printing portion 1 may be guided by the gate member 240, enter the second route 232, and may be discharged to the discharge tray 100 by the discharge rollers 291 and 292 along an upper side of the dividing plate 220.

In a structure in which the first route 231 and the second route 232 are not divided, the print medium P discharged from the printing portion 1 may be discharged to the discharge tray 100 through the reading member 210, regardless of whether the scanning operation is performed. In this process, an alien substance on the print medium P discharged from the printing portion 1, for example, dust, paper powder, printing materials (e.g., toner, ink, etc.), and the like may come off from the print medium P and be located on the scan glass 211. In a case where the scan glass 211 is polluted by an alien substance, light irradiated from the reading member 210 on the print medium P during the scanning operation may be scattered, blocked, etc. or light reflected from the print medium P and directed toward the reading member 210 may be scattered, blocked, etc. Such scattering, blocking, etc. of light may deteriorate the scanning quality. According to an example, the first route 231 and the second route 232 are separated, and in a case where a scanning operation is not performed, the print medium P may be guided to the second route 232. The print medium P may be transported along the upper side of the dividing plate 220. As the scan glass 211 of the reading member 210 is covered by the dividing plate 220, pollution of the scan glass 211 of the reading member 210 by an alien substance carried by the print medium P may be reduced. Further, as the first route 231 and the second route 232 are divided by the dividing plate 220 which covers the scan glass 211 of the reading member 210 and functions as a white bar, a partition structure to divide the first route 231 and the second route 232 may be omitted. Accordingly, the component cost of the image forming apparatus may be reduced.

Figure 4:
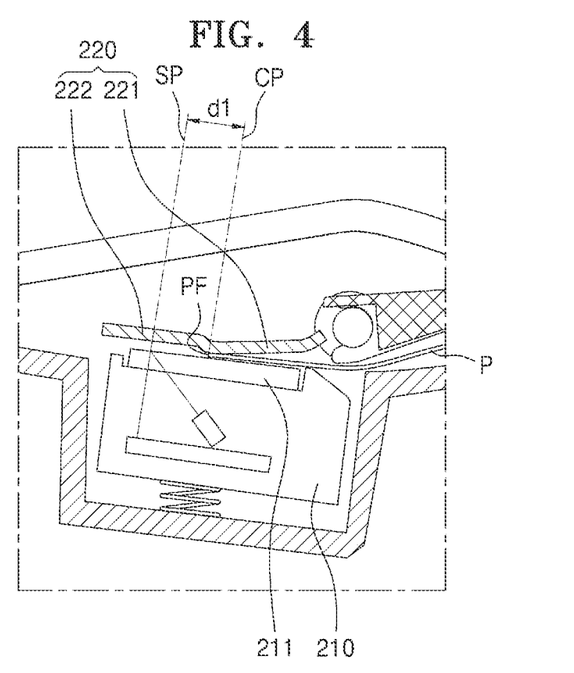
FIG. 4 is a diagram of a dividing plate according to an example.
Figure 5:
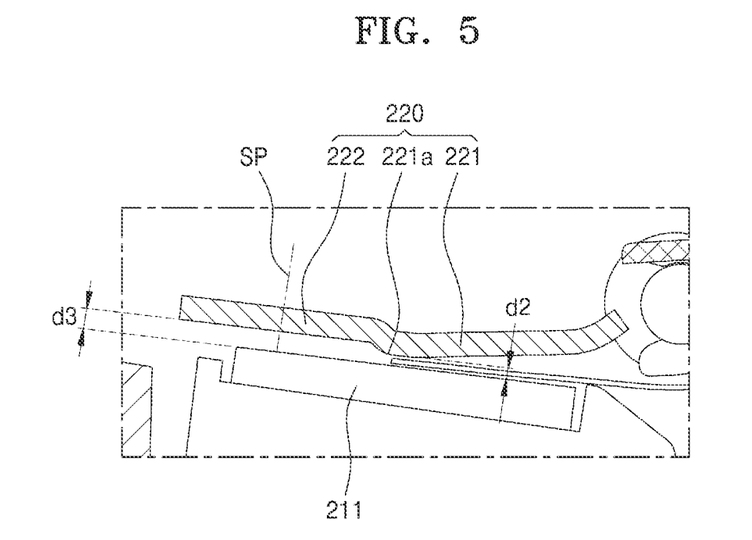
FIG. 5 is a diagram showing a distance relationship between a dividing plate and a scan glass of a reading member according to an example.

FIG. 4 is a diagram of the dividing plate 220 according to an example. FIG. 5 is a diagram showing a distance relationship between the dividing plate 220 and the scan glass 211 of the reading member 210 according to an example.

With reference to FIGS. 4 and 5, the dividing plate 220 may have a structure to guide the print medium P so that a front end PF of the print medium P entering the first route 231 is guided toward the scan glass 211 to contact with the scan glass 211. The dividing plate 220 may have a structure to guide the print medium P so that a contact position CP at which the front end PF of the print medium P is to contact with the scan glass 211 is a position that is spaced apart and upstream by a certain distance d1 from a reading position SP of the reading member 210 in a transport direction of the print medium P. The distance d1 may be set so that the image side of the print medium P is evenly in contact with the scan glass 211 without a gap therebetween based on the front end PF of the print medium P reaching the reading position SP. The distance d1 may be selected in consideration of a characteristic of the print medium P such as the stiffness, etc. of the print medium P used in the image forming apparatus. For example, the distance d1 may be greater than or equal to 3 mm. As the print medium P is transported with its front end PF in contact with the scan glass 211, an alien substance on the scan glass 211 may be removed by the print medium P. For example, as the front end PF of the print medium P is in contact with the scan glass 211 at an upstream of the reading position SP, an alien substance on the reading position SP of the scan glass 211 may be removed. In other words, the print medium P may function as a scrapper to scrape off an alien substance on the scan glass 211 such that the scan glass pollution may be reduced or prevented. Accordingly, the need for follow-up management due to the pollution of the scan glass 211 may be decreased or removed, and the costs for maintenance borne by a user or a seller may also be reduced.

For example, the dividing plate 220 may include a first portion 221 and a second portion 222. The first portion 221 may be inclined downwards toward the scan glass 211 so that the front end PF of the print medium P entering the first route 231 is directed toward the scan glass 211. A distance between the first portion 221 and the scan glass 211 may gradually decrease in a direction from the upstream to the downstream. The second portion 222 may oppose the reading position SP. The second portion 222 may be arranged side by side with the scan glass 211. A downstream end 221a of the first portion 221 may be closer to the scan glass 211 than is the second portion 222. In other words, a distance d2 between the downstream end 221a of the first portion 221 and the scan glass 211 may be less than a distance d3 between the second portion 222 and the scan glass 211. Due to such structure, the front end PF of the print medium P may be stably in contact with the scan glass 211 at the upstream of the reading position SP.

In an example where a follow-up management of print quality of the printing portion 1 is to be performed, an image on the print medium P discharged from the printing portion 1 may be checked. In this case, a follow-up management expert may visit a site where the image forming apparatus is located, examine an image of the print medium P, and perform follow-up measures depending on a result of examination. According to an example, the print quality may be remotely examined without visiting a site where the image forming apparatus is located.

FIG. 6 is a schematic block diagram of an image forming apparatus according to an example. With reference to FIG. 6, the image forming apparatus may include the printing portion 1, a processor 20, a memory 30, a communication portion 40, the reading member 210, and the actuator 260. The processor 20 may control a printing process, a reading process, and other operations of the image forming apparatus. The processor 20 may include a central processing unit (CPU). In the memory 30, an application program including various commands to control the printing process and the reading process and various control factors for control may be stored. The memory 30 may store image information scanned by the reading member 210. The processor 20 may control the printing process and the reading process by executing an application program. Although it is not shown in the drawings, the processor 20 may include a driving circuit to drive various control elements. The communication portion 40 may include at least one of a wired communication module or a short-range wireless communication module such as Bluetooth, Wi-Fi, etc. The communication portion 40 may communicate with an external device through a wireless network 51 and/or a wired network 52.

Figure 7:
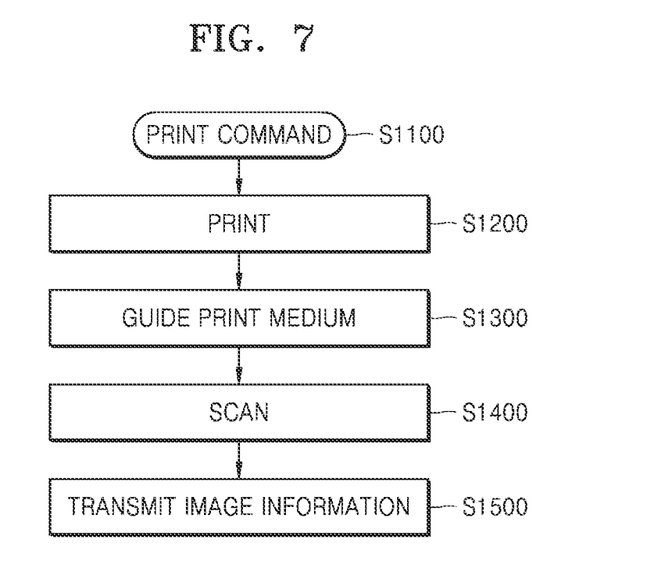
FIG. 7 is a flowchart illustrating a method of controlling an image forming apparatus according to an example.

FIG. 7 is a flowchart illustrating a method of controlling an image forming apparatus according to an example. An example of a method of controlling an image forming apparatus is described with reference to FIGS. 1 to 7. An example method of controlling an image forming apparatus may include receiving a print command in operation S1100, printing an image on a print medium P using a printing portion 1 in operation S1200, selectively guiding the print medium P discharged from the printing portion 1 to a first route 231 in which a reading member 210 is arranged or a second route 232 which is a detour route in operation S1300, and reading the image from the print medium P guided to the first route 231 using the reading member 210 in operation S1400. For example, based on a print command being entered from a host (not shown) through the communication portion 40 in operation S1100, the processor 20 may print an image on the print medium P by driving the printing portion 1 in operation S1200. The host may be, for example, a server installed in a follow-up management site of the image forming apparatus, a computer of a follow-up management expert, a portable terminal, etc. The image may be, for example, a test image to check the print quality. For example, the test image may include a registration pattern to check the registration of a printed image in the main scanning direction and the sub-scanning direction, an image concentration pattern to check the image concentration of a printed image, etc. The test image may be prestored, for example, in the memory 30. The test image may be received from the outside through the communication portion 40.

In an example, the processor 20 may control the actuator 260 so that the gate member 240 is shifted to the first position. In that case, the print medium P discharged from the printing portion 1 may be guided to the first route 231. The print medium P may be guided by the dividing plate 220, and the front end PF of the print medium P may contact with the scan glass 211 of the reading member 210 at the contact position CP spaced apart upstream by a certain distance d1 from the reading position SP. The print medium P may be transported along the first route 231. The processor 20 may control the reading member 210 to read image information from the image side of the print medium P. The image information read by the reading member 210 may be stored in, for example, the memory 30. In operation S1500, the processor 20 may control the communication portion 40 to transmit the image information to the host, for example, a server installed in a follow-up management site of the image forming apparatus, a computer of a follow-up management expert, a portable terminal, etc. through the wireless network 51 and/or the wired network 52.

The follow-up management expert may check the print quality of the printing portion 1 by analyzing the transmitted image information, and take follow-up measures remotely in a case where such follow-up measures can be taken by a remote control. In a case where a site visit is performed, an expert may prepare various materials beforehand based on the analyzed information and visit the site where the image forming apparatus is located to take follow-up measures. As such, according to an example method of controlling the image forming apparatus, the maintenance efficiency may be improved. Further, as the first route 231 in which the reading member 210 is arranged is divided from the second route 232 to discharge the print medium P without the scanning process, pollution of the scan glass 211 of the reading member 210 may be reduced, and accurate image information reflecting the print quality may be obtained. Accordingly, the print quality of the image forming apparatus and various measures may be accurately identified.

Figure 8:
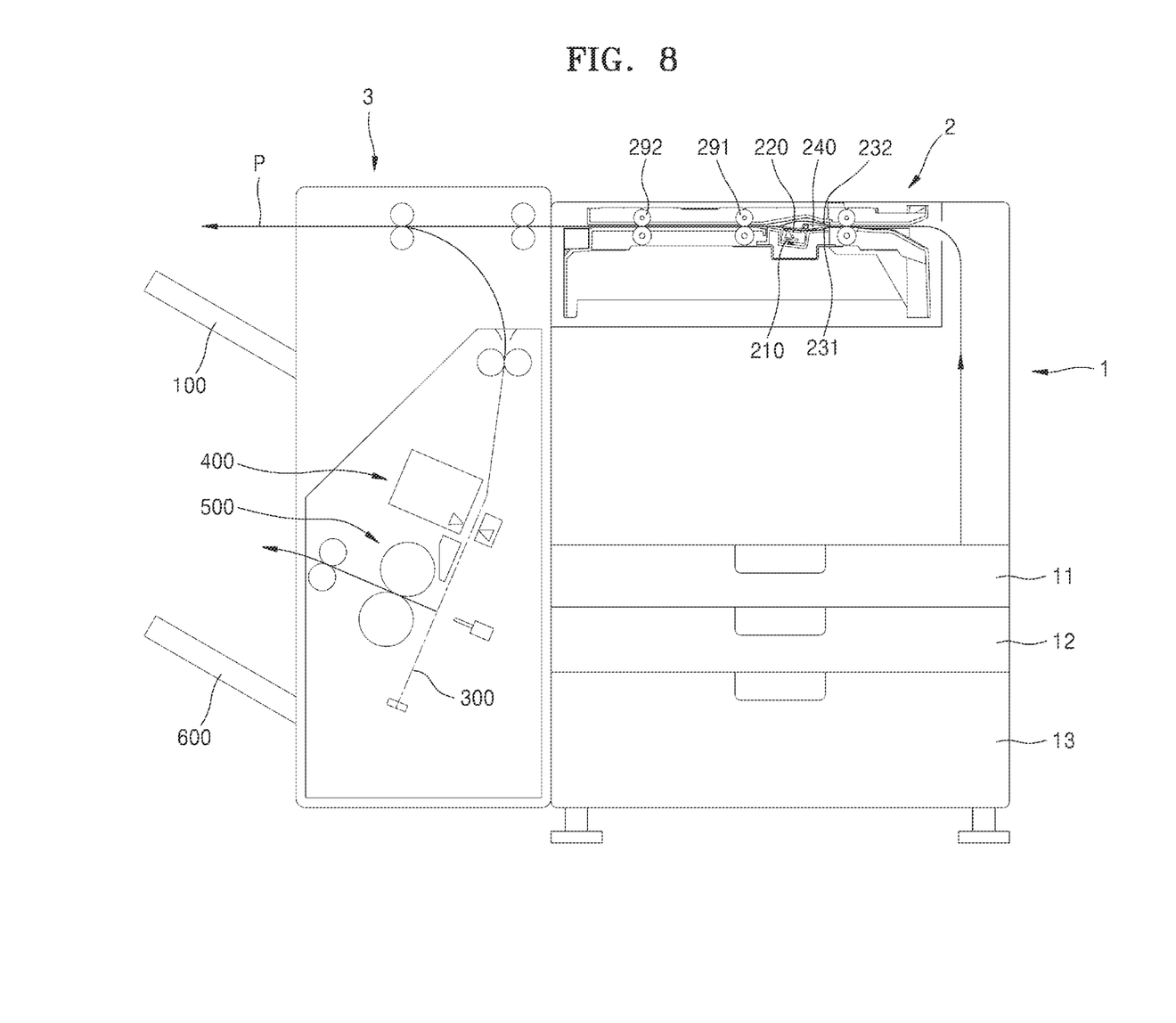
FIG. 8 illustrates an image forming apparatus according to an example.

FIG. 8 is a schematic block diagram of an image forming apparatus according to an example. With reference to FIG. 8, an image forming apparatus may include a post processing portion 3 arranged between the discharge tray 100 and the scanning portion 2. Descriptions will be provided focusing on differences between the example of FIG. 8 and the examples described earlier with respect to FIGS. 1 to 7. With reference to FIG. 8, the print medium P discharged from the scanning portion 2 may be discharged to the discharge tray 100 through the post processing portion 3. For example, in a case where a post processing is performed, the print medium P may be transported to a post process route 300. In a case where post processing is not performed, the print medium P may be discharged to the discharge tray 100 without passing through the post process route 300. The post processing portion 3 may perform post processing, such as binding, punching, folding, etc. on the print medium P. For example, the post processing portion 3 may include a binding unit 400 to bind the print medium P on the post process route 300. In an example, the post processing portion 3 may include a folding portion 500 to perform a folding process in which the print medium P is folded at least one time. The print medium P folded by the folding portion 500 may be discharged to a discharge tray 600.

Examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An image forming apparatus comprising:
a printing portion to print an image on a print medium;
a gate member at an outgoing side of the printing portion to selectively guide the print medium discharged from the printing portion to a first route or a second route; and
a reading member in the first route to read the image from the print medium discharged from the printing portion, wherein the reading member includes:
a scan glass; and
a dividing plate opposing the scan glass, the dividing plate defining at least a portion of the first route and at least a portion of the second route and dividing the first route and the second route.

2. The image forming apparatus of claim 1,
wherein the dividing plate has a fixed position, and
wherein the image forming apparatus further comprises an elastic member to apply an elastic force to the reading member in a direction approaching the dividing plate.

3. The image forming apparatus of claim 1, wherein the dividing plate opposing the scan glass of the reading member is to guide the print medium so that a front end of the print medium is in contact with the scan glass.

4. The image forming apparatus of claim 3, wherein the dividing plate is to guide the print medium so that a contact position at which the front end of the print medium is in contact with the scan glass is a position spaced apart upstream by a certain distance from a reading position of the reading member.

5. The image forming apparatus of claim 4, wherein the dividing plate includes a first portion inclined towards the scan glass to direct the front end of the print medium toward the scan glass, and a second portion side by side with the scan glass at the reading position.

6. The image forming apparatus of claim 1, further comprising a post processing portion to perform post processing on the print medium.

7. An image forming apparatus comprising:
a printing portion to print an image on a print medium;
a reading member to read an image from the print medium discharged from the printing portion; and
a dividing plate, opposing a scan glass of the reading member, to guide the print medium so that a front end of the print medium discharged from the printing portion contacts the scan glass, wherein the dividing plate divides a first route guiding the print medium between the scan glass and the dividing plate and a second route guiding the print medium above the dividing plate.

8. The image forming apparatus of claim 7, wherein the dividing plate is to guide the print medium so that a contact position at which the front end of the print medium contacts the scan glass is spaced apart upstream by a certain distance from a reading position of the reading member.

9. The image forming apparatus of claim 7, wherein the dividing plate includes a first portion inclined towards the scan glass to direct the front end of the print medium toward the scan glass, and a second portion side by side with the scan glass.

10. The image forming apparatus of claim 7, further comprising an elastic member to apply an elastic force to the reading member in a direction approaching the dividing plate.

11. The image forming apparatus of claim 7, further comprising a gate member between the printing portion and the reading member to selectively guide the print medium discharged from the printing portion to the first route between the scan glass and the dividing plate or the second route above the dividing plate.

12. A method of controlling an image forming apparatus, the method comprising:
- printing an image on a print medium using a printing portion;
- selectively guiding the print medium discharged from the printing portion to a first route including a reading member or a second route not including the reading member, including a dividing plate dividing the first route and the second route, the dividing plate defining at least a portion of the first route and the second route; and
- reading image information from the print medium guided to the first route using the reading member.

13. The method of claim 12, wherein the printing includes printing a test image on the print medium.

14. The method of claim 13, further comprising transmitting the image information.

* * * * *